United States Patent
Omar

(10) Patent No.: US 8,185,259 B2
(45) Date of Patent: May 22, 2012

(54) FUZZY LOGIC-BASED CONTROL METHOD FOR HELICOPTERS CARRYING SUSPENDED LOADS

(75) Inventor: Hanafy M. Omar, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 138 days.

(21) Appl. No.: 12/861,502

(22) Filed: Aug. 23, 2010

(65) Prior Publication Data

US 2012/0046810 A1    Feb. 23, 2012

(51) Int. Cl.
*G01C 23/00* (2006.01)

(52) U.S. Cl. .............. 701/3; 701/4; 701/27; 701/40; 701/44; 701/46; 701/57; 701/58; 701/60; 701/10; 244/3.21; 244/17.11; 244/26; 244/164; 244/171; 244/184; 244/177; 244/181; 244/183; 244/191; 706/2; 706/3; 706/4; 706/5; 706/6; 706/13; 706/903; 706/905; 706/913; 700/28; 700/29; 700/48; 700/50; 700/54

(58) Field of Classification Search ................ 701/3, 4, 701/27, 40, 44, 46, 57, 58, 60, 10; 244/17.11, 244/3, 26, 164, 171; 706/2, 3, 4, 5, 6, 13, 706/903, 905, 913; 700/28, 29, 48, 50, 54, 700/55
See application file for complete search history.

(56) References Cited

U.S. PATENT DOCUMENTS

| 6,189,836 B1 * | 2/2001 | Gold et al. ............... 244/191 |
| 6,532,454 B1 * | 3/2003 | Werbos ..................... 706/14 |
| 8,104,720 B2 * | 1/2012 | Hirvonen et al. .......... 244/194 |

* cited by examiner

*Primary Examiner* — Redhwan k Mawari
(74) *Attorney, Agent, or Firm* — Richard C. Litman

(57) ABSTRACT

The fuzzy logic-based control method for helicopters carrying suspended loads utilizes a controller based on fuzzy logic membership distributions of sets of load swing angles. The anti-swing controller is fuzzy-based and has controller outputs that include additional displacements added to the helicopter trajectory in the longitudinal and lateral directions. This simple implementation requires only a small modification to the software of the helicopter position controller. The membership functions govern control parameters that are optimized using a particle swarm algorithm. The rules of the anti-swing controller are derived to mimic the performance of a time-delayed feedback controller. A tracking controller stabilizes the helicopter and tracks the trajectory generated by the anti-swing controller.

18 Claims, 21 Drawing Sheets

Fig. 17

Level of Distance Required for the Anti-Swing Controller 1700

| x | | $\dot{\phi}$ | | | | |
|---|---|---|---|---|---|---|
| $\phi$ | | NB (-2) | NS (-1) | ZO (0) | PS (1) | PB (2) |
| NB (-2) | | 0 | -1 | -2 | -3 | -4 |
| NB (-1) | | 1 | 0 | -1 | -2 | -3 |
| ZO (0) | | 2 | 1 | 0 | -1 | -2 |
| PS (1) | | 3 | 2 | 1 | 0 | -1 |
| PB (2) | | 4 | 3 | 2 | 1 | 0 |

Fuzzy Rules for the Anti-Swing Controller

| $\phi_L$ \ $\dot{\phi}_L$ | NB | NS | ZO | PS | PB |
|---|---|---|---|---|---|
| NB | NB | NS | ZO | NS | PB |
| NS | ZO | NS | NS | NB | NB |
| ZO | PS | ZO | NS | NS | NB |
| PS | PS | PS | ZO | NS | NS |
| PB | PB | PB | PS | ZO | NS |
| | | | | PS | ZO |

*Fig. 18*

| Controller | ISH |
|---|---|
| DASC with Optimal Gains | 294 |
| FASC without MF Optimization | 302 |
| FASC with MF Optimization | 229 |

Comparison between DASC and FASC

*Fig. 19*

Performance of the Designed Controllers with Variation of Load Weight

| $m_r$ | Optimized DASC | FASC | Optimized FASC | PDFC | Optimized PDFC |
|---|---|---|---|---|---|
| 0.3 | 339 | 311 | 234 | 563 | 376 |
| 0.5 | 288 | 302 | 229 | 534 | 362 |
| 0.7 | 251 | 294 | 226 | 509 | 351 |
| 0.9 | 221 | 287 | 224 | 488 | 342 |

Rules of the Classical PD Fuzzy Controller

| x | | $\dot{\phi}_L$ | | | |
|---|---|---|---|---|---|
| $\phi_L$ | NB | NS | ZO | PS | PB |
| NB | NB | NB | ZO | PS | PB |
| NS | NB | NS | NS | NS | ZO |
| ZO | NS | NS | NS | ZO | PS |
| PS | NS | ZO | PS | PS | PB |
| PB | ZO | PS | PS | PB | PB |

FUZZY LOGIC-BASED CONTROL METHOD FOR HELICOPTERS CARRYING SUSPENDED LOADS

BACKGROUND OF THE INVENTION

1. Field of the Invention

The present invention relates to feedback control systems and methods, and more specifically to a fuzzy logic-based control method for helicopters carrying suspended loads that provides a fuzzy logic-based anti-swing feedback control system capable of stabilizing a helicopter and its suspended load.

2. Description of the Related Art

Helicopters can be used in carrying heavy loads in civil, military, and rescue operations where the use of ground based equipment would be impractical or impossible. An unmanned small-scale helicopter can be used also in landmine detection application. The global landmine problem is indeed significant, with the United Nations estimating that there are more than 100 million mines in the ground and that 50 people are killed each day by mines worldwide. The idea is to suspend the mine detection equipment as a slung load underneath a low-cost model helicopter, which has the considerable advantage over a ground based vehicle that it needs no contact with the ground. Therefore, there is no risk of the mines being detonated in the detection process. In these applications, the external load behaves like a pendulum. If the pendulous motion of the load exceeds certain limits, it may damage the load or threaten the life of the rescued person. Moreover, the external load can change natural frequencies and mode shapes of the low frequency modes of the helicopter. In addition, the aerodynamics of the load may make it unstable in certain flight conditions. These problems slow or even prevent an accurate pickup or placement of the load. Moreover, it adds extra effort on the pilot.

The dynamics of a helicopter with external suspended loads received considerable attention in the late 1960's and early 1970's. Two reasons for this interest were the extensive external load operations in the Vietnam War, and the Heavy Lift Helicopter program (HLH). This interest has been renewed recently with the advances in modern control technologies. A lot of efforts were made for modeling the slung load and studying its effect on helicopter dynamics, however there are relatively few works that discussed control of a helicopter sling. Examples of automatic control for helicopters with slung loads include a single-cable dynamic model developed using a straightforward application of Lagrange equations, and an expanded version of this model, which includes two tandem cables. However, such a formulation was based on the Newton-Euler equations of motion for small perturbations separated into longitudinal and lateral sets. The disadvantage was that aerodynamic forces on the cables and the load were neglected, as were the helicopter rotor dynamic modes.

Other methods involved the computerized simulation of a helicopter and external load in real time with a pilot in the loop. Load aerodynamics was incorporated into the model, as well as rotor-downwash effects in hover.

Moreover, other developed control requirements for sling-load stabilization involved linearized equations of motion of the helicopter, winch, cable, and load for variable suspension geometry and were then used in conjunction with modern control theory resulting in a design of several control systems for each type of suspension.

Other researchers examined the feasibility of stabilizing external loads by means of controllable fins attached to the cargo. A major disadvantage was that in such a system, a simple linear model representing the yawing and the pendulous oscillations of the slung-load system assumes that the helicopter motion is unaffected by the load. Additionally, the use of active aerodynamic Load Stabilization Systems for a helicopter sling-load system has been investigated.

All the above studies are based on the classical control techniques. What is needed is a new anti-swing controller for a helicopter slung load system near hover flight. Such a controller should be based on feedback of the load swing angles. The output from such a controller would be additional displacements that are added to the helicopter trajectory in the longitudinal and lateral directions. Hence, its implementation would be simple and need small modification to the software of a helicopter position controller. It would be desirable to utilize fuzzy logic in an evolutionary computation optimized controller.

Particle swarm optimization (PSO) is a population based stochastic optimization technique, which is inspired by social behavior of bird flocking, or fish schooling. PSO shares many similarities with evolutionary computation techniques such as Genetic Algorithms (GA. The system is initialized with a population of random solutions and searches for optima by updating generations. However, unlike GA, FL has no evolution operators such as crossover and mutation. In PSO, the potential solutions, called particles, fly through the problem space by following the current optimum particles. Compared to GA, the advantages of PSO are that PSO is easy to implement and there are few parameters to adjust.

Moreover, PSO like all evolutionary algorithms optimizes a performance index based on input/output relationships only; therefore, minimal knowledge of the plant under investigation is required. In addition, because derivative information is not needed in the execution of the algorithm, many pitfalls that gradient search methods suffer from can be overcome. Given optimal control parameters fuzzy logic membership functions based on load swing angles can be developed and rules can be designed to operate on the fuzzy sets to provide the required feedback control operations.

Thus, a fuzzy logic-based control method for helicopters carrying suspended loads solving the aforementioned problems is desired.

SUMMARY OF THE INVENTION

The fuzzy logic-based control method for helicopters carrying suspended loads utilizes a controller based on fuzzy logic membership distributions of sets of load swing angles. The anti-swing controller is fuzzy-based and has controller outputs that include additional displacements added to the helicopter trajectory in the longitudinal and lateral directions. This simple implementation requires only a small modification to the software of the helicopter position controller. Moreover, the implementation of this controller does not need rates of the swing angles. The membership functions govern control parameters that are optimized using a particle swarm algorithm. The rules of the anti-swing controller are derived to mimic the performance of a time-delayed feedback controller. A tracking controller stabilizes the helicopter and tracks the trajectory generated by the anti-swing controller. Simulation results show the effectiveness of the control system in suppressing the swing of the slung load while stabilizing the helicopter.

These and other features of the present invention will become readily apparent upon further review of the following specification and drawings.

BRIEF DESCRIPTION OF THE DRAWINGS

FIG. 17 is a plot showing distance Level required for the anti-swing controller.

FIG. 18 is a plot showing Fuzzy Rules for the anti-swing controller.

FIG. 19 is a plot showing a comparison between a delayed anti-swing controller (DASC) and a FASC.

FIG. 20 is a plot showing performance of the designed controllers with variation of load weight.

FIG. 21 is a plot showing rules of the classical proportional-derivative (PD) fuzzy controller.

Similar reference characters denote corresponding features consistently throughout the attached drawings.

DETAILED DESCRIPTION OF THE PREFERRED EMBODIMENTS

Figure 1:
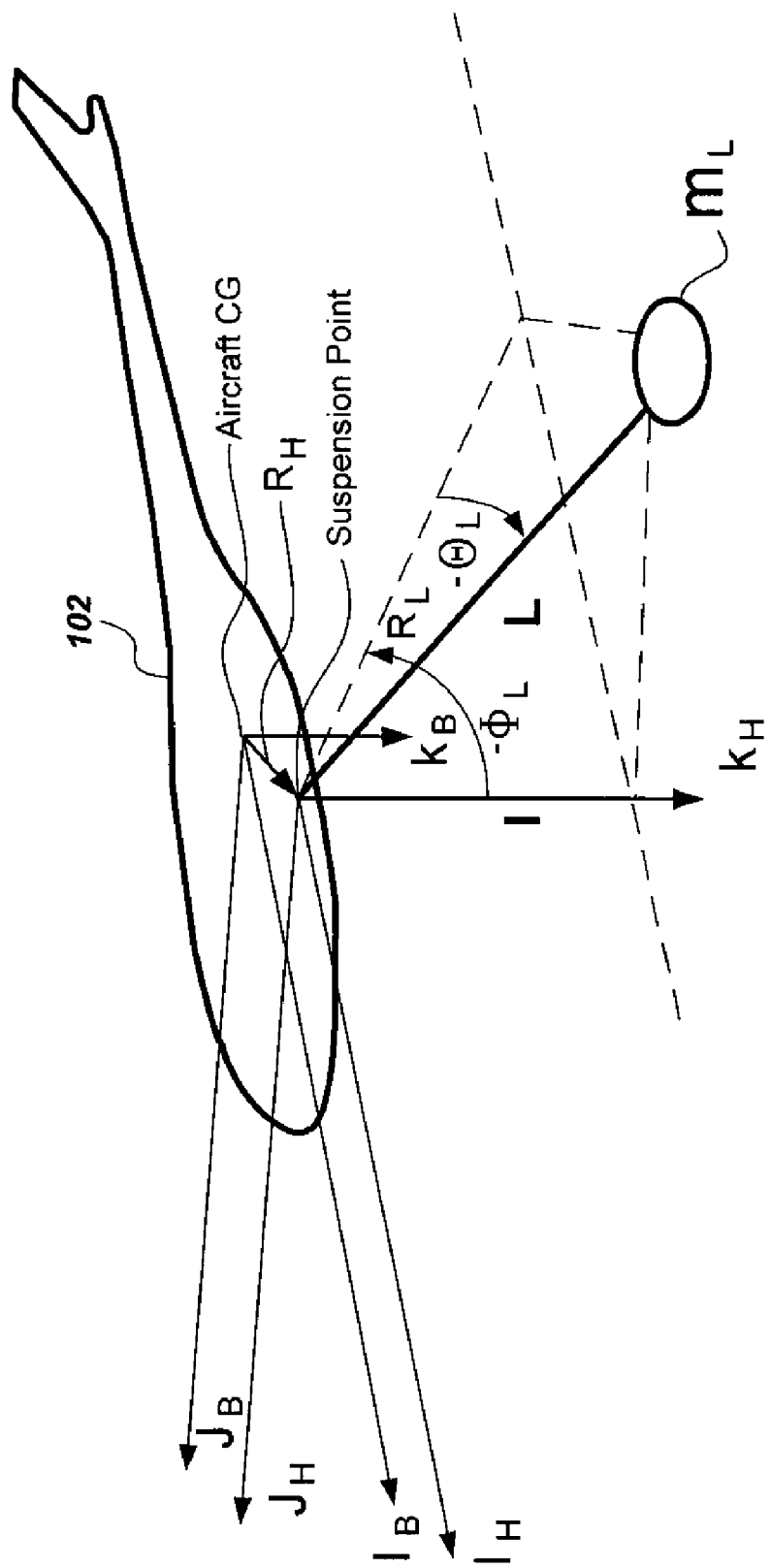
FIG. 1 is a diagram showing the configuration of a helicopter carrying a suspended load.
Figure 2:
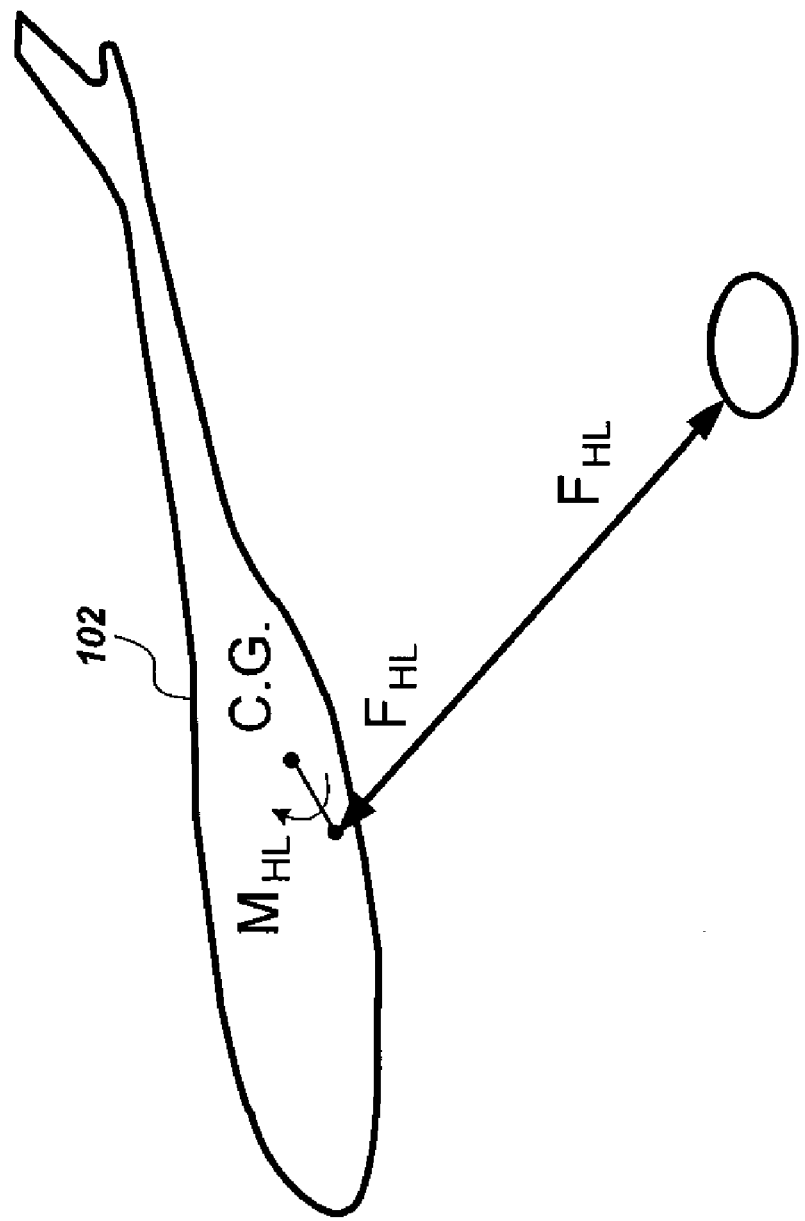
FIG. 2 is a diagram showing the load contribution to helicopter forces.
Figure 3:
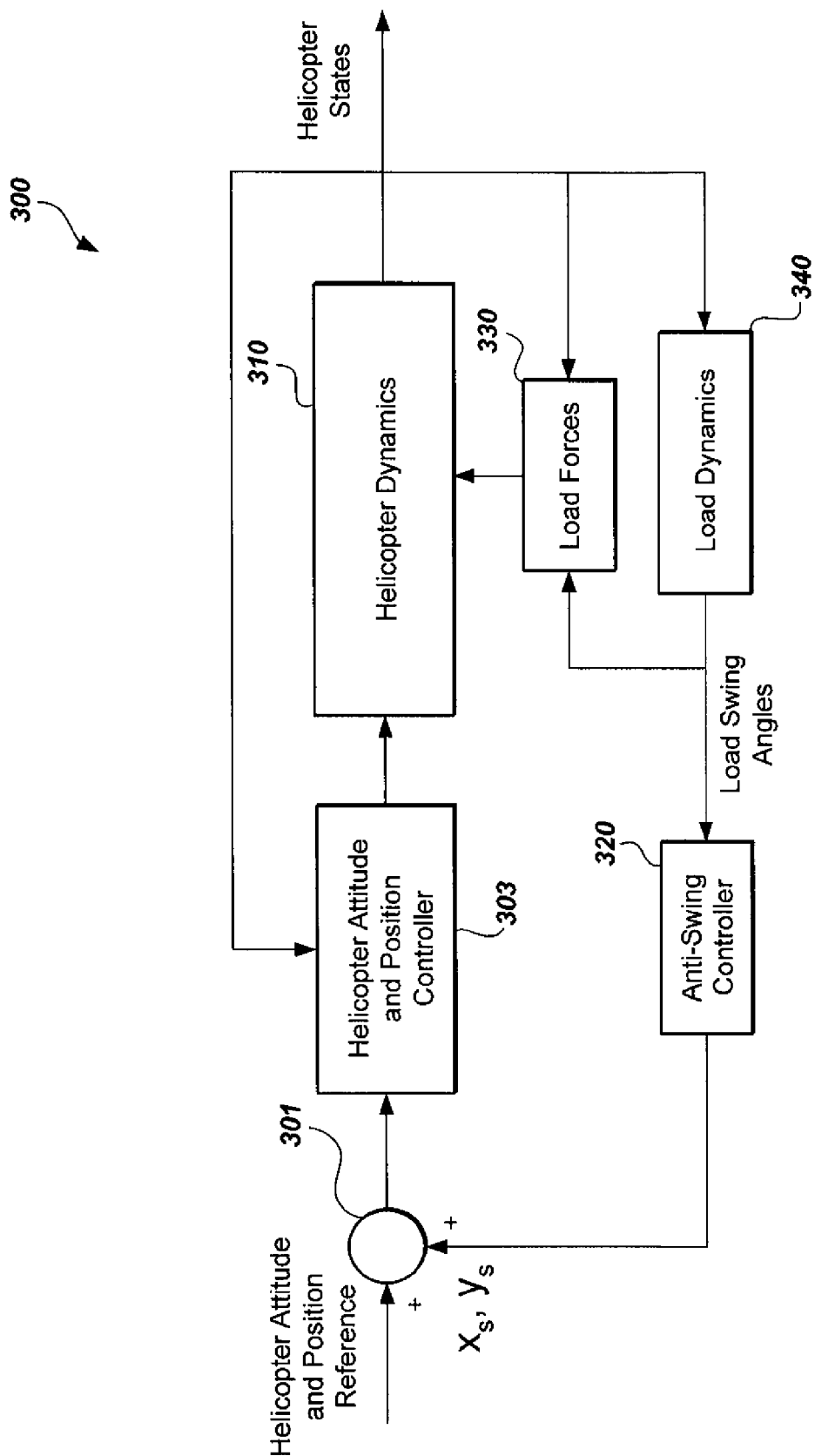
FIG. 3 is a block diagram showing a load swing control system used in a fuzzy logic-based control method for helicopters carrying a suspended load according to the present invention.

As shown in FIG. 3, the control method for helicopters carrying a suspended load utilizes a tracking controller 303 and an anti-swing controller 320. As shown in FIGS. 1 and 2, the helicopter with a slung system can be considered as a multi-body dynamical system. The equations of motion of each body can be written alone and then modified by adding the interaction forces between them. At the outset, frequently used equation nomenclature is set forth below, as follows:

Nomenclature
$F_{HL}$=Force transferred from the load to the helicopter
$k_d$=gain of the delayed feedback controller
L=load cable length
$m_L$=load mass
$M_{HL}$=Moment transferred from the load to the helicopter
N=number of particles in FL
FASC=fuzzy anti-swing controller
$R_H$=hook position vector
$R_L$=load position vector
p,q,r=helicopter angular velocities
$V_{max}$=maximum velocity of FL particles
u,v,w=helicopter velocities
x,y,z=helicopter CG position
$\Phi,\theta,\phi$=Euler angles
$\Phi_L,\theta_L$=load swing angles
$\tau_d$=time delay
$\gamma_1,\gamma_2$=Particle Swarm learning factors.

The helicopter is modeled as a rigid body with six degrees of freedom. The twelve helicopter states include translational velocities (u,v,w), angular velocities (p,q,r), Euler angles ($\Phi,\theta,\phi$) and helicopter position (x,y,z).

The external load is modeled as a point mass that behaves like a spherical pendulum suspended from a single point. The cable is assumed to be inelastic and with no mass. The geometry and the relevant coordinate systems are shown in FIG. 1. The unit vectors $i_H$, $j_H$, $k_H$ of the "hook" coordinate system always remain parallel to those of the body axis system of helicopter 102. The position of the load is described by the two angles $\Phi_L$ and $\theta_L$, where $\theta_L$, is load angle in the xz plane where $\Phi_L$ is the load oscillation angle out of xz plane. Therefore, the position vector $R_L$ of the load with respect to the suspension point is given by:

$$R_L = L\cos(\theta_L)\sin(\Phi_L)i_H + L\sin(\theta_L)j_H + L\cos(\theta_L)\cos(\Phi_L)k_H \quad (1)$$

The position vector $R_H$ of the hook with respect to the helicopter center of gravity (c. g.) is given by:

$$R_H = x_H i_H + y_H j_H + z_H k_H \quad (2)$$

The absolute velocity $V_L$ of the load is given by:

$$V_L = V_{cg} + \dot{R} + \Omega \times R \quad (3)$$

where $V_{cg}$ is the absolute velocity of the center of mass of the helicopter, $R=R_L+R_H$ is the position vector of the load with respect to the center of mass of the helicopter, and $\Omega = pi_H + qj_H + rk_H$ is the angular velocity of the helicopter. The absolute acceleration $a_L$, of the load is:

$$a_L = \dot{V}_L + \Omega \times V_L \quad (4)$$

The unit vector in the direction of the gravity force is given by:

$$K_g = -\sin(\theta)i_H + \sin(\Phi)\cos(\theta)j_H + \cos(\phi)\cos(\theta)k_H \quad (5)$$

Beside the gravity, there is an aerodynamic force applied on the point mass load. Since the analysis in this work will be restricted to the helicopter motion near hover, the aerodynamics loads on the load will be neglected.

The equations of motion of the load are written by enforcing moment equilibrium about the suspension point, that is, in matrix form:

$$R_L \times (-m_L a_L + m_L g k_g) = 0 \quad (6)$$

The above equation gives three scalar equations of second order, only the equations in the x and y directions are retained which represent the equations of motion of the load.

The suspended load introduces additional terms in the rigid body force and moment equations of motion of the helicopter, namely load forces 330 and load dynamics 340, as shown in FIG. 3. The force and moment loads, $F_{HL}$ and $M_{HL}$ are shown in FIG. 2. The force that the load exerts on the helicopter is given by:

$$F_{HL} = -m_L a_L + m_L g k_g \quad (7)$$

The additional moment $M_{HL}$ is therefore given by:

$$M_{HL} = R_H \times F_{HL} \quad (8)$$

The above equations give highly nonlinear expressions. These equations cannot be used for stability analysis. Therefore, they must be linearized around the trim condition. To be able to perform the linearization process, the trim values of the helicopter and the load must be determined.

The obtained equations are nonlinear and complicated. For the design purpose, these equations are linearized about the hovering conditions. Near hover, the forward speed is nearly zero (i.e. $u_o=0$). Assuming that the helicopter roll angle is also zero even with the effect of the load on the helicopter (i.e. $\Phi_o=0$) simplifies the analysis. At this condition, the load trim equations give the following trim values.

$$\theta_{Lo} = 0, \Phi_{Lo} = -\theta_0 \quad (9)$$

Imposing above results to the linearized load equations obtains the following equations of motion for the load, $$g\theta_L - g\cos(\theta_o)\phi + y_h\dot{q} + \dot{V} + L\ddot{\theta}_L = 0 \quad (10)$$

$$L\ddot{\Phi}_L + g\Phi_L + g\theta + (x_h - L\sin(\theta_o))\cos(\theta_o)\dot{p} + z_h\sin(\theta_o)\dot{r} + L\cos(\theta_o)\sin(\theta_o)\dot{r} + \cos(\theta_o)\dot{U} + \sin(\theta_o)\dot{W} = 0 \quad (11)$$

The forces exerted by the load on the helicopter are;

$$F_x = m_L(-g\cos[\theta_o]\theta - xh\dot{p} + L\sin[\theta_o]\dot{p} - \dot{U}[t] - L\cos[\theta_o]\dot{\Phi}_L)$$

$$F_y = m_L(g\cos[\theta_o]\Phi - y_h\dot{q} - \dot{V} - L\ddot{\theta}_L)$$

$$F_z = m_L(-g\sin[\theta_o]\theta - (z_h + L\cos[\theta_o])\dot{r} - \dot{W} - L\sin[\theta_o]\dot{\Phi}_L) \quad (12)$$

The moments in the x-y-z directions are;

$$M_x = m_L \begin{pmatrix} -gy_h\sin[\theta_o]\theta - gz_h\cos(\theta_o)\phi + y_hz_h\dot{q} - \\ y_h(z_h + Ly_h\cos[\theta_o])\dot{r} + z_h\dot{V} - y_h\dot{W} + \\ Lz_h\dot{\theta} - Ly_h\sin[\theta_o]\ddot{\phi}_L \end{pmatrix} \quad (13)$$

$$M_y = m_L \begin{pmatrix} -gz_h\cos[\theta_o]\theta + gx_h\sin[\theta_o]m_L\theta - x_hz_hm_L\dot{p} + \\ Lz_h\sin[\theta_o]\dot{p} + x_hz_h\dot{r} + Lx_h\cos[\theta_o]\dot{r} - z_h\dot{U} + \\ x_hW - Lz_h\cos[\theta_o]\ddot{\phi}_L + Lx_h\sin[\theta_o]\ddot{\phi}_L \end{pmatrix}$$

$$M_z = m_L \begin{pmatrix} gy_h\cos[\theta_o]\theta + gx_h\cos[\theta_o]\phi + x_hy_h\dot{p} - \\ Ly_h\sin[\theta_o]\dot{p} - x_hy_h\dot{q} + y_h\dot{U} - x_h\dot{V} - \\ Lx_h\dot{\theta}L + Ly_h\cos[\theta_o]\ddot{\phi}_L \end{pmatrix}$$

These equations are linear and can be formulated in a state space form. If the load state vector is defined as $x_L = [\dot{\Phi}_L \dot{\theta}_L \Phi_L \theta_L]^T$, the load equations in state space can be written as:

$$E_L \dot{x} = A_L x \quad (14)$$

where x is the state vector for the load and the helicopter (i.e., $x = [x_H x_L]$).

Similarly, the effect of the load on the helicopter force terms can be written also as:

$$\begin{bmatrix} F_{HL} \\ M_{HL} \end{bmatrix} = E_{HL} \dot{x} + A_{HL} x \quad (15)$$

The linearized equations of motion of the helicopter and the load can be written in the following state space forms;

$$\dot{x} = \begin{bmatrix} \dot{x}_h \\ \dot{x}_L \end{bmatrix} = Ax + B\eta \quad (16)$$

Referring to the control system diagram 300 of FIG. 3, the tracking controller 303 for the helicopter 102 is designed to follow the trajectory generated by the anti swing controller 320. Therefore, the controller design of the whole system can be divided into two stages. In the first stage, the tracking controller 303 for the helicopter 102 alone is designed by neglecting the effect of the slung load suspended by distance L on the helicopter dynamics 310. The function of the tracking controller 303 is to stabilize the helicopter 102 and follow the trajectory generated by the anti-swing controller 320. In the second stage, the whole system is integrated by augmenting of the dynamics of the controlled helicopter with the dynamics of the slung load. Then the fuzzy-based anti-swing controller (FASC) is added to the integrated system and the performance of the whole system is evaluated. The optimal parameters of the anti-swing controller are determined based on minimizing the history of the load swing. The optimal parameters of the anti-swing controller are determined based on minimizing the history of the load swing.

To design the tracking controller, it is assumed that the reference trajectory for the helicopter states is $x_{ref}$ then the error signal is $e = x_{Href} - x_H$. Using state feedback technique, the helicopter control input can be written as;

$$\eta = K(x_{Href} - x_H) \quad (17)$$

The feedback gain matrix K is chosen such that the error history is minimum. The feedback gain (K) can be determined using the linear quadratic regulator technique (LQR), which depends on minimizing a quadratic function that can be written as;

$$Indx = \int_0^{\tau_f} (e^T Q e + \eta^T R \eta) dt \quad (18)$$

Since, the goal is to minimize the error signal, Q is chosen with high gains compared to R. After determining K, the helicopter state space model can be rewritten as, $$\dot{x}_H = (A_H - B_H K)x_H + B_H K x_{Href} = A_c x_H + B_c x_{Href} \quad (19)$$

The above equation indicates that the reference states become the new inputs for the helicopter.

In the second stage, the anti-swing controller is designed. After modifying the helicopter dynamics by incorporating the stability and tracking controller, the effect of the load swing forces are added to the helicopter state space model. Before this step, Equation (19) needs to be expressed in terms of the total state vector, which includes the helicopter and the load states. In this case, the helicopter dynamics can be written as:

$$\dot{x}_H = [A_c \ 0]\begin{bmatrix} x_H \\ x_L \end{bmatrix} + [Bc \ 0]\begin{bmatrix} x_{Href} \\ 0 \end{bmatrix} = A_1 x + B_1 x_{ref} \quad (20)$$

The slung load effect modifies the forces and moments equations in the helicopter equations of motion. Recalling Equation (15), the forces and moments from the slung load can be written as, $$\begin{bmatrix} F_{HL} \\ M_{HL} \end{bmatrix} = E_{HL}\dot{x} + A_{HL}x \qquad (21)$$

Adding these forces to the helicopter dynamics, the new model can be written as:

$$\begin{bmatrix} I & 0 \\ 0 & 0 \end{bmatrix}\begin{bmatrix} \dot{x}_h \\ \dot{x}_l \end{bmatrix} = \left(\begin{bmatrix} A_1 \\ [0]_{4\times 16} \end{bmatrix} + \begin{bmatrix} [0]_{3\times 16} \\ A_{HL} \\ [0]_{7\times 16} \end{bmatrix}\right)x + \begin{bmatrix} [0]_{3\times 16} \\ E_{HL} \\ [0]_{7\times 16} \end{bmatrix}\dot{x} + \begin{bmatrix} B_1 \\ [0]_{4\times 12} \end{bmatrix}x_{ref} \qquad (22)$$

The load dynamics can be written as:

$$E_L\dot{x} = A_L x \qquad (23)$$

By adding the previous two equations together, the final state space model for the combined systems (Helicopter and the slung load) is obtained, $$(I-E_2+E_L)\dot{x} = (A_2+A_L)x + B_2 x_{ref}$$

$$\dot{x} = (I-E_2+E_L)^{-1}(A_2+A_L)x + (I-E_2+E_L)^{-2}B_2 x_{ref}$$

$$\dot{x} = A_f x + B_f x_{ref} \qquad (24)$$

The time-delayed feedback of the load swing angles can be used to provide a delayed anti-swing controller (DASC). The anti-swing controller for load swing in the longitudinal direction can be expressed as follows:

$$x_s = k_d L \Phi_L(t-\tau) \qquad (25)$$

where $x_s$ is the traveling distance of the helicopter measured from the hovering position. $k_d$ is the feedback constant and $\tau$ is the time delay. A fuzzy version of the aforementioned DASC is developed. To get an estimate of the fuzzy rules for the anti-swing controller, a relationship between the fuzzy inputs and the output is discovered. In the instant case, the inputs are the swing angle and the swing angle rate while the output is the traveling distance of the helicopter center of gravity (CG) in the longitudinal or lateral directions. Based on the concept of time-delayed feedback where the traveling distance is proportional to the time-delayed feedback of the load swing angles, we can express the swing angle rate as:

$$\frac{d\phi_L}{dt} \approx \frac{\phi_L(t)-\phi_L(t-\tau)}{\tau} \qquad (26)$$

Rearranging the above equation, by expressing the delayed swing angle by the angle itself and the angle derivative, produces the relation;

$$\phi_L(t-\tau) \approx \frac{\phi_L(t)-\tau\dot{\phi}_L(t)}{\tau} \qquad (27)$$

Equation (27) means that the time-delayed swing angle is generally the difference between the swing angle and its derivative. Since, the fuzzy output is proportional to the time-delayed feedback of the swing angle, which means that it is also proportional to the difference between the swing angle and its rate. Based on this observation, the fuzzy rules can be constructed.

Figure 4:
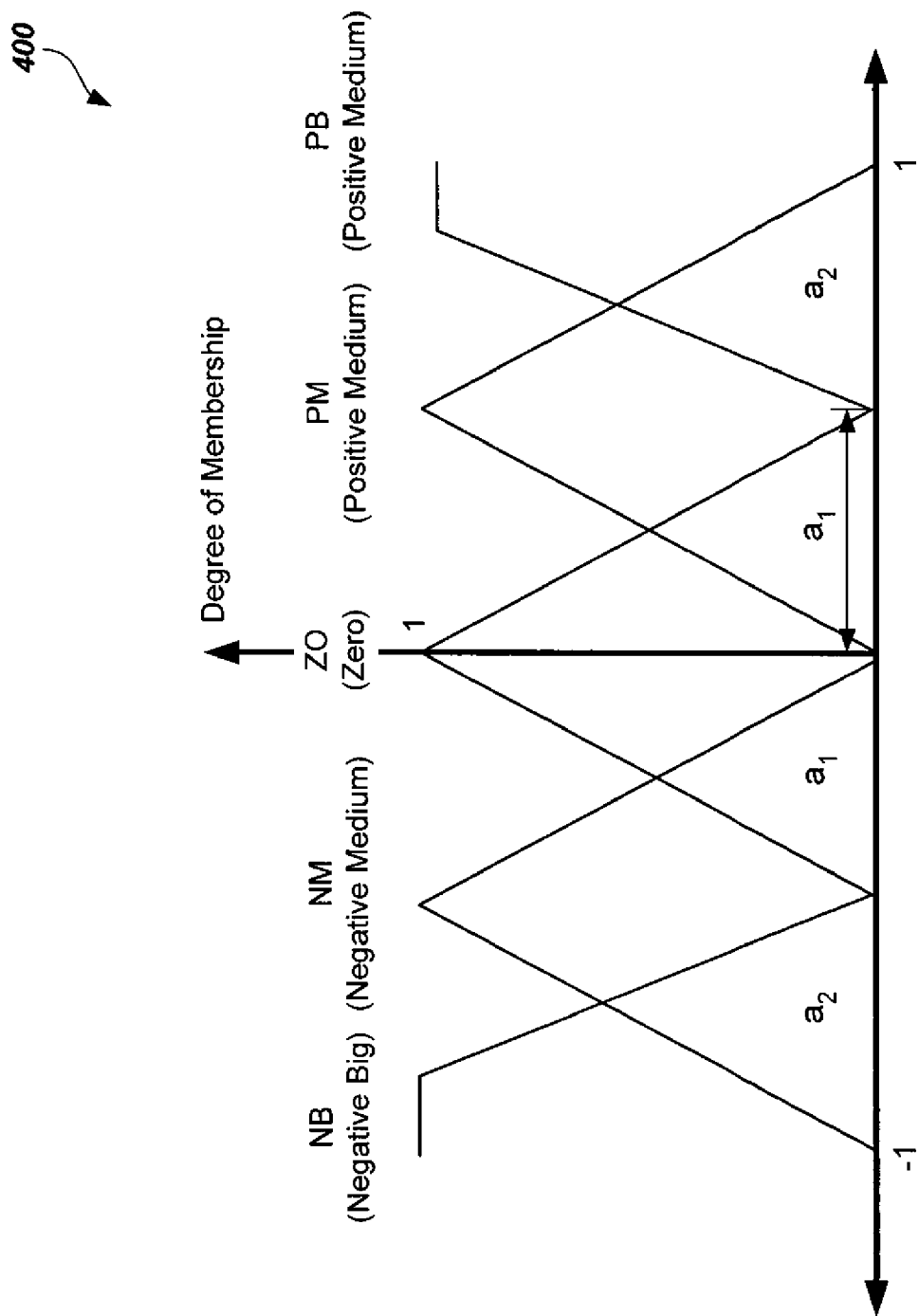
FIG. 4 is a plot showing typical normalized membership functions.

The assumption is made that there are five membership functions (MF5) for all the fuzzy inputs and outputs namely (NB, NS, ZO, PS, and PB) as shown in diagram 400 of FIG. 4. a number can then be assigned for each MF to represent its level. For five MFs, the normalized range is between −2 to 2. Since the traveling distance is linearly proportional to the difference between the swing angle and its rate, tabular diagram 1700 of FIG. 17 can be constructed. Using the clustering technique, we can assume that −4 to −3 represent the output fuzzy variable NB, −2 to −1 for NS, 0 for Zero, 1 to 2 for PS, and finally 3 to 4 for PB. Hence, the fuzzy rules for the anti-swing controller can be constructed as shown in tabular diagram 1800 of FIG. 18.

Since the ranges of the membership functions are normalized, scaling factors are used to transform these normalized ranges to the physical operating ranges. If we assume that the maximum allowed swing angle, swing angle rate and travel distance of the helicopter center of gravity due to swing are $\Phi_{L_{max}}, \dot{\Phi}_{L_{max}}$ and $x_{s_{max}}$ respectively, then the corresponding scaling factors are determined as:

$$K_\phi = \frac{1}{\phi_{L_{max}}}, K_{\dot{\phi}} = \frac{1}{\dot{\phi}_{L_{max}}}, K_x = x_{s_{max}} \qquad (28)$$

The anti-swing controller for the lateral direction is similar as the one developed for controlling the longitudinal direction.

PSO simulates the behaviors of bird flocking. Suppose the following scenario: a group of birds are randomly searching food in an area. There is only one piece of food in the area being searched. All the birds do not know where the food is. But they know how far the food is in each iteration. So what's the best strategy to find the food? The effective one is to follow the bird that is nearest to the food.

PSO learns from the scenario and uses it to solve the optimization problems. In PSO, each single solution is a bird, i.e., particle in the search space. All of particles have fitness values, which are evaluated by the fitness function to be optimized, and have velocities, which direct the flying of the particles. The particles fly through the problem space by following the current optimum particles.

PSO is initialized with a group of random particles (solutions) and then searches for optima by updating generations. In every iteration, each particle is updated by following two best values. The best values represent the lowest values for the objective function since our problem is a minimization problem. For each particle, $P_{best}$ is the best solution (fitness) achieved so far during the iteration. Another best value that is tracked by the particle swarm optimizer is the best value obtained so far by any particle in the population, which is, by definition, a global best, i.e., $G_{best}$. After finding these two best values, the particle updates its velocity and positions with the following two equations as:

$$v_i(k+1) = v_i(k) + \gamma_1(P_{best} - x_{pi}(k)) + \gamma_2(G_{best} - x_{pi}(k)) \qquad (29)$$

$$x_{pi}(k+1) = x_{pi}(k) + v_i(k+1) \qquad (30)$$

where v is the particle velocity and $x_p$ is the current particle position (solution). The pseudo code of the procedure is as follows:

//Randomly initialize N particles
Do
For each particle
Calculate fitness value (i.e. objective function)
If the fitness value is better than the best fitness value ($P_{best}$) in history, set current value as the new $P_{best}$
end
End
Choose the particle with the best fitness value of all the particles as the $G_{best}$
For each particle
Calculate particle velocity according equation (29)
Update particle position according equation (30)
End
While maximum iterations or minimum error criteria is not attained.//

The exemplary Chinook helicopter was chosen since the aerodynamics derivatives near hover is available in the literature. Without loss of generality, the following data for numerical simulation is assumed.

Tracking controller equation:

$$K=10^3 I, Q=I \quad (31)$$

Load equation:

$$L=15 \text{ ft}, x_h=y_h=z_h=0, m_r=0.5 \quad (32)$$

The scaling factors can be estimated based on the following maximum values for the swing angles, and the allowed traveling distance of the helicopter CG in the longitudinal direction.

$$\Phi_{L_{max}}=20 \text{ deg}, \dot{\Phi}_{L_{max}}=3, x_{s_{max}}=0.1 L \quad (33)$$

The parameters of the anti-swing controller for the lateral direction have the same values as the longitudinal controller. It is assumed that all the membership functions are equally distributed (i.e. $a_1=a_2=0.5$).

Figure 5:
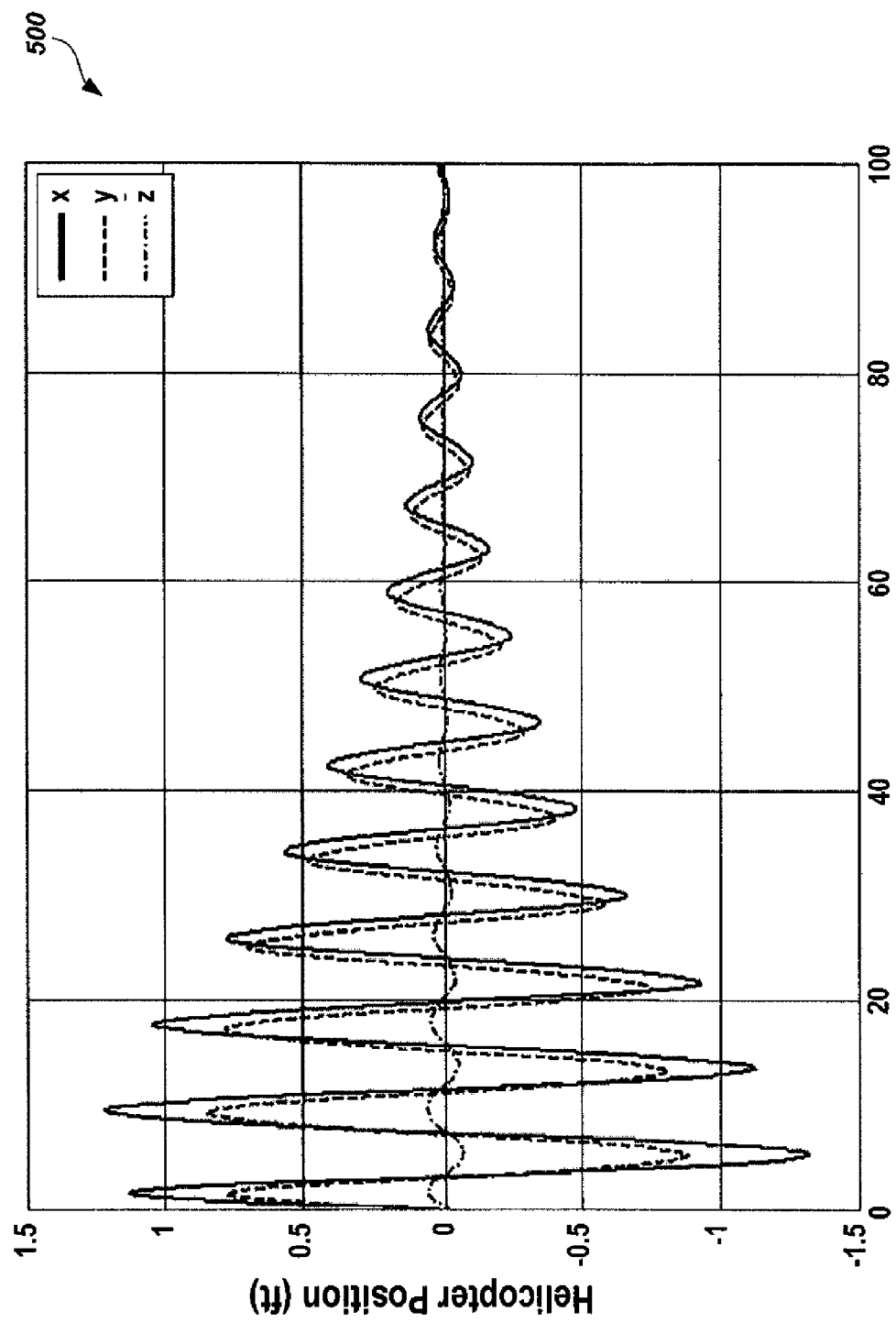
FIG. 5 is a plot showing the time history of helicopter CG.
Figure 6:
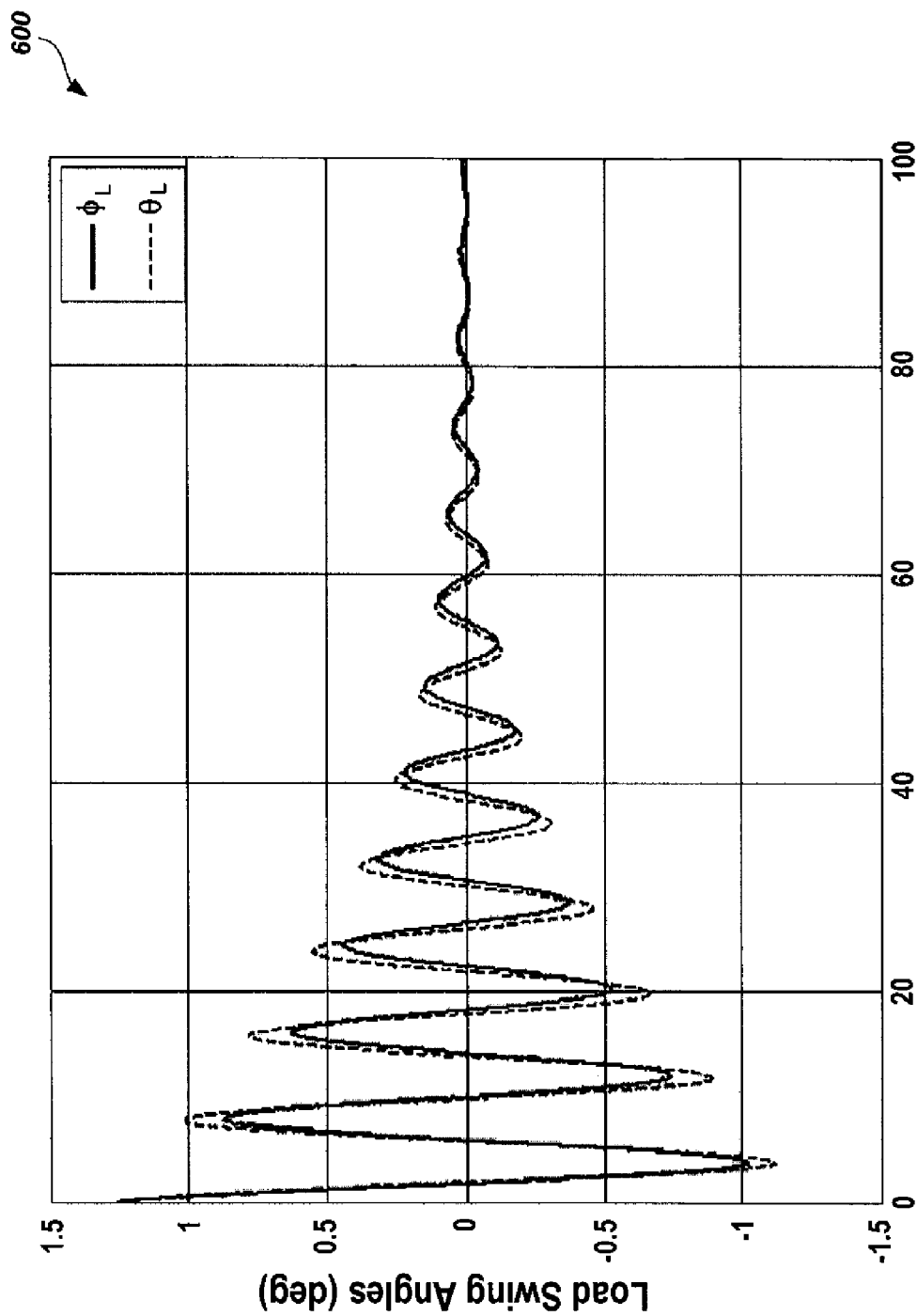
FIG. 6 is a plot showing time history of load swing angles.
Figure 7:
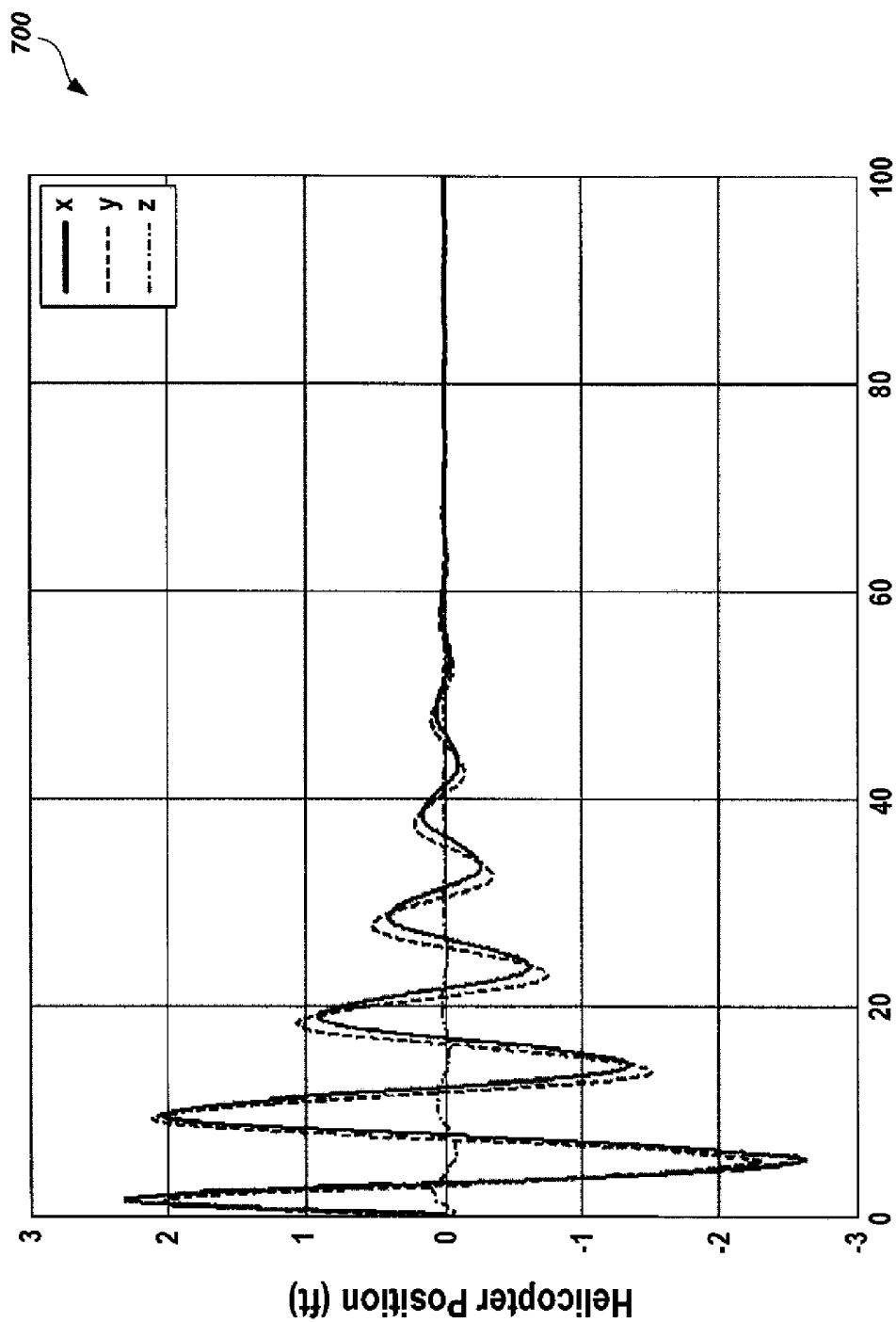
FIG. 7 is a plot showing the time history of helicopter CG for 0.3 L.
Figure 8:
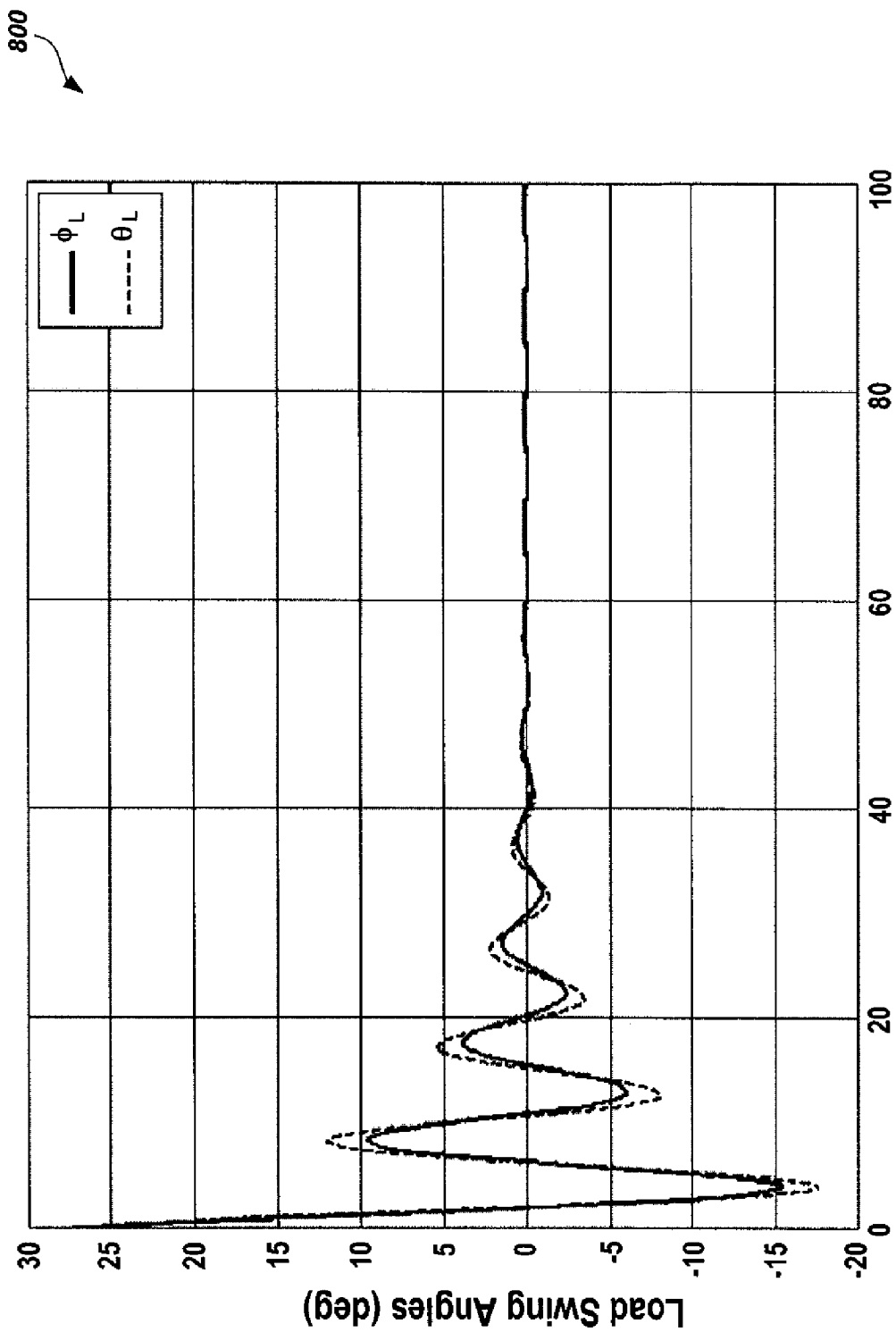
FIG. 8 is a time history of load swing angles for xs ys=0.

Plot 500 of FIG. 5 and plot 600 of FIG. 6 show the time history of the helicopter CG and the suspended load swing angles due to high initial disturbance in the load swing angles. This disturbance represents the worst scenario. These results indicate the effectiveness of the controller in suppressing the load swing. The implementation of the fuzzy-based anti-swing controller (FASC) makes the helicopter move from its initial position, but due to the FASC, the helicopter returns back to its original hovering position as a result of the stability of the control system. The maximum deviation in helicopter position is below 1.5 ft, which can be considered small. However, the settling time is approaching 100 sec. To increase the damping level and decrease the settling time, the FASC parameters are adjusted. When the maximum allowed traveling distance is increased to 0.3 L, the damping increases and the settling time decreases but the deviation of the helicopter CG from the hovering condition is increased as shown in plots 700 and 800 of FIG. 7 and FIG. 8, respectively.

Figure 9:
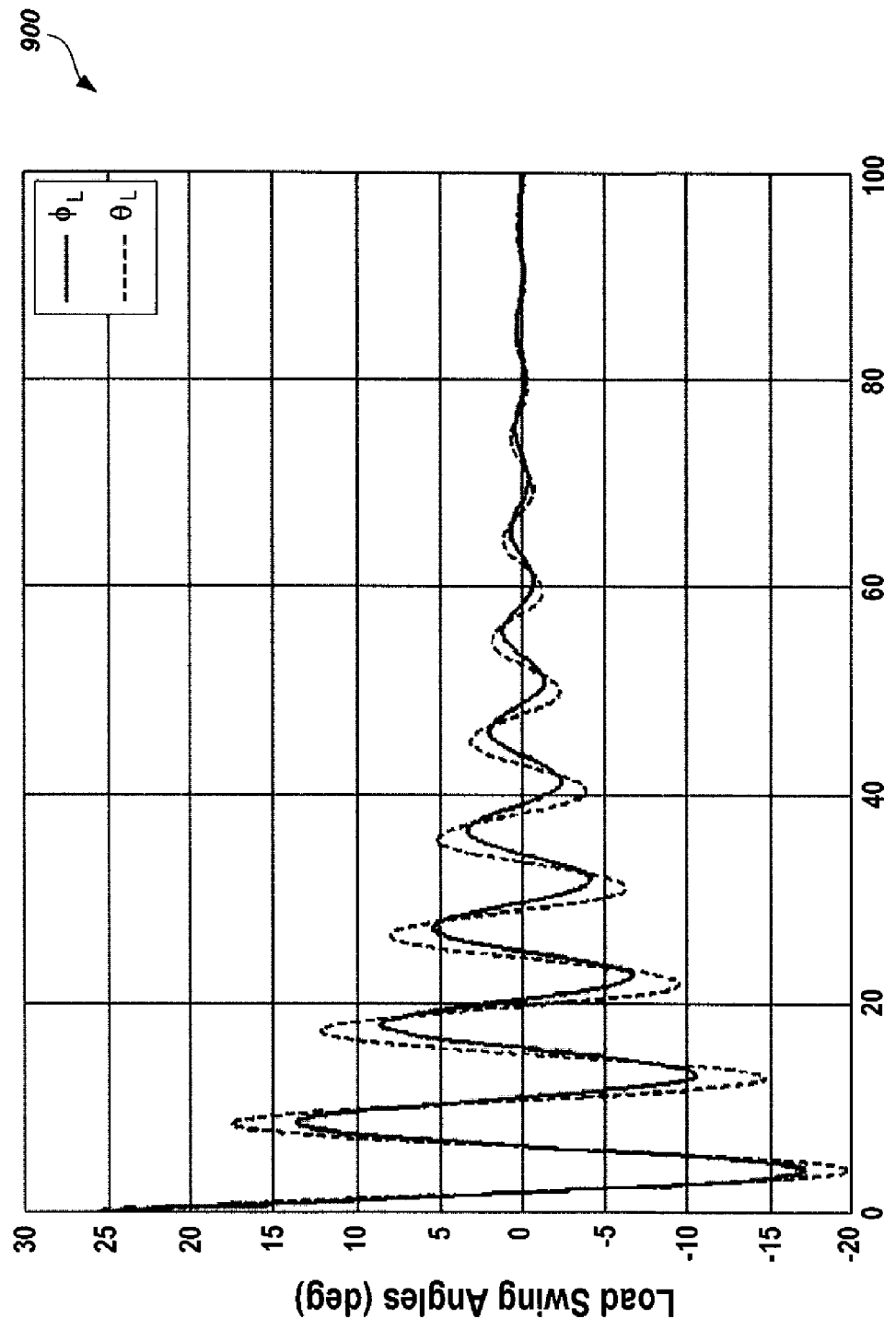
FIG. 9 is a plot showing time history of load swing angles $x_s, y_s = 0.3$ L for a PDFC.
Figure 10:
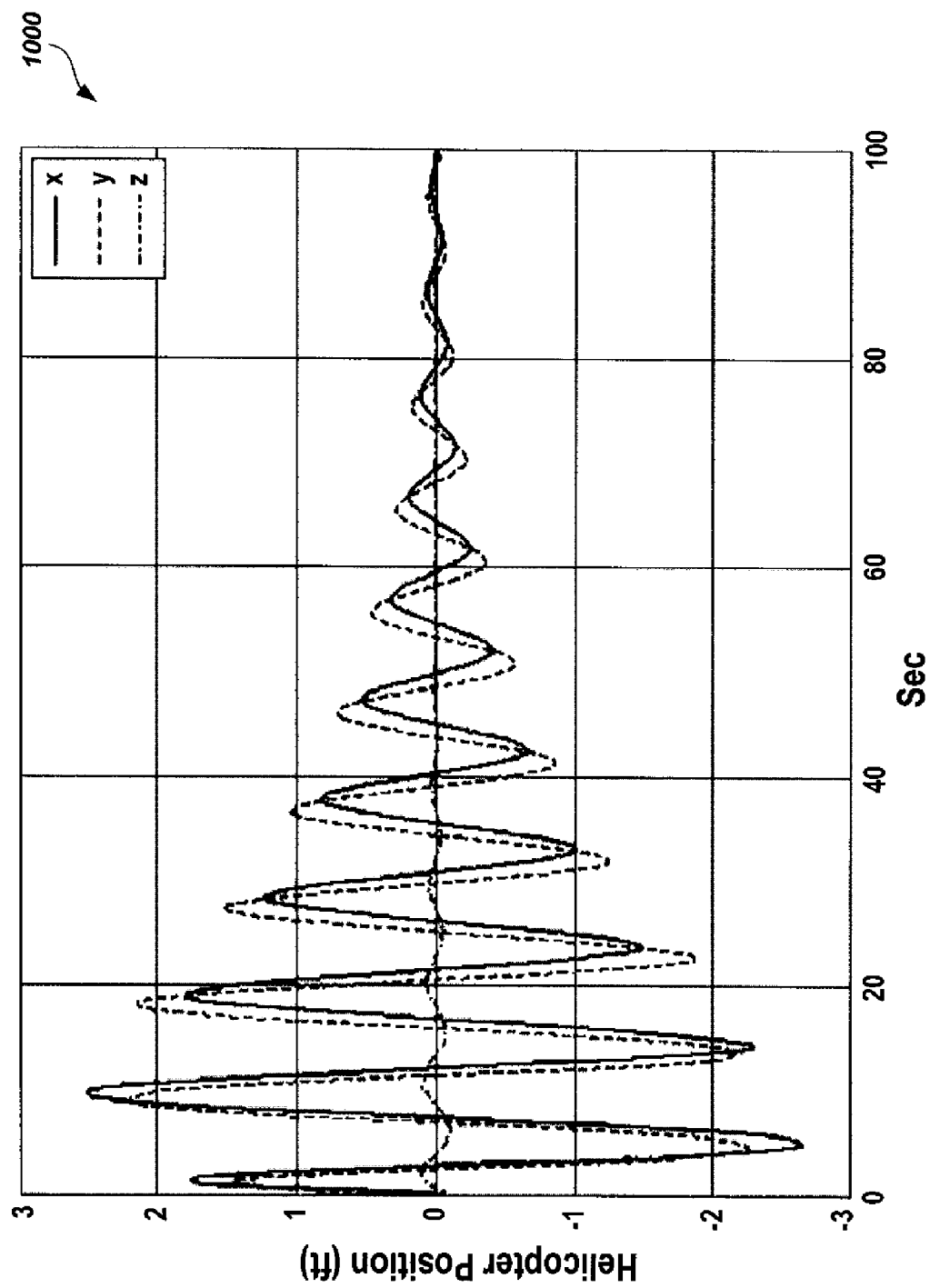
FIG. 10 is a plot showing Time history of CG for $x_s = y_s = 0.3$ for a proportional-derivative fuzzy controller (PDFC).

Before optimizing the MF distribution of the proposed FASC, the potential of using the classical Proportional-Derivative fuzzy controller (PDFC) as an anti-swing controller is checked. The rules of PDFC can be generated by the same technique used for generating the rules for FASC except that the control action of PDFC will be proportional to the summation of swing angle and the swing angle rate to mimic the behavior of the classical PD controller. Therefore, the rules of PDFC are shown in Tabular diagram 2100 of FIG. 21. Plot 900 of FIG. 9 and plot 1000 of FIG. 10 show that FASC has better performance than PDSC.

With the same scaling factors and the initial condition of the swing angle rates, PSO is implemented to optimally tune the distribution of the two fuzzy controllers. There are six parameters that should be determined by P50 to minimize the performance index ISH. Each one of these parameters determines the distribution of the membership functions (MFs) for each fuzzy variable as shown in Membership Function plot 400 of FIG. 4.

The optimization of MFs parameters was done for the worst scenario in which the load wing angles were set to 25 degrees. The simulation ran for 100 sec and the performance index was evaluated for each particle using ODE5 solver with 0.01 seconds for the sampling period.

The parameters of the PSO algorithm used in obtaining the optimized Membership Function distributions are, $$N=30, V_{max}=2, \gamma_1=\gamma_2=1 \quad (34)$$

All the particles in the initial population are generated randomly, except only one particle that is filled with 0.5 for all the parameters. This value corresponds to the fuzzy controller designed in the previous section where all Membership Functions are uniformly distributed across the normalized range.

Since the optimization algorithm has stochastic behavior, multiple runs are performed to ensure obtaining the same optimum values.

Figure 11:
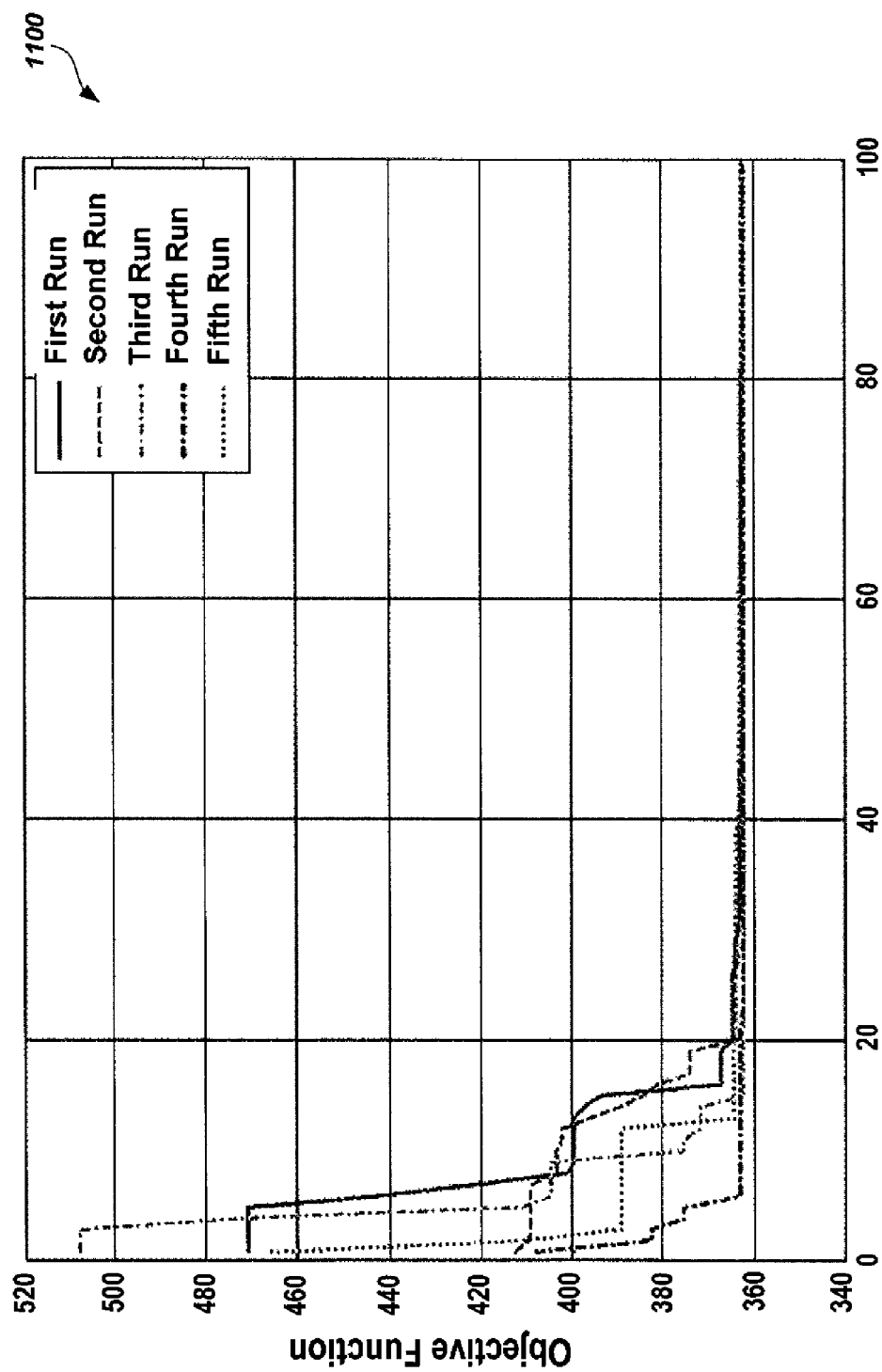
FIG. 11 is a plot showing Evolution of particle swarm optimization (PSO) for optimizing membership functions for a proportional-derivative fuzzy controller (PDFC).
Figure 12:
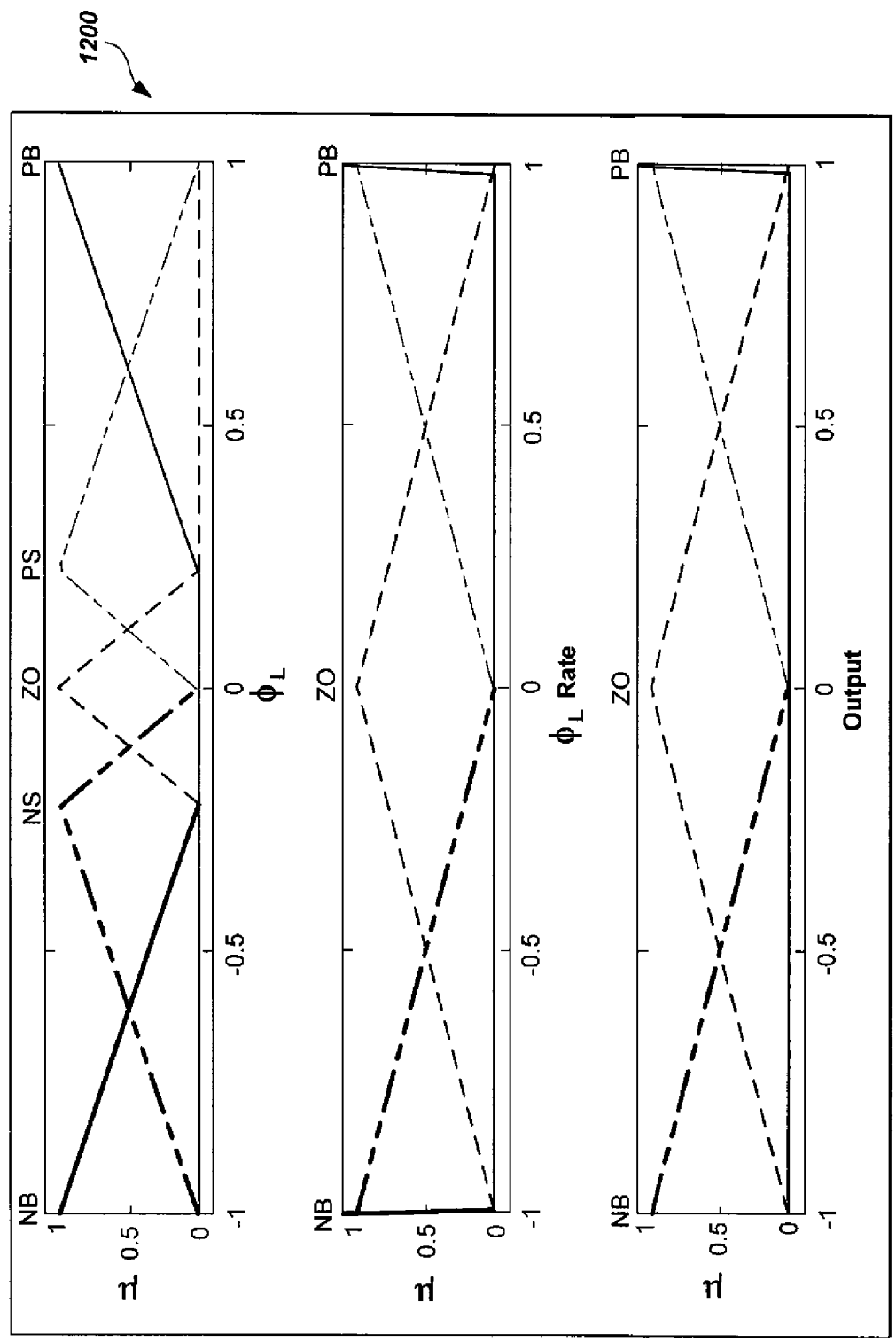
FIG. 12 is a plot showing optimized membership function distribution for in-plane swinging movement using a proportional-derivative fuzzy controller (PDFC).
Figure 13:
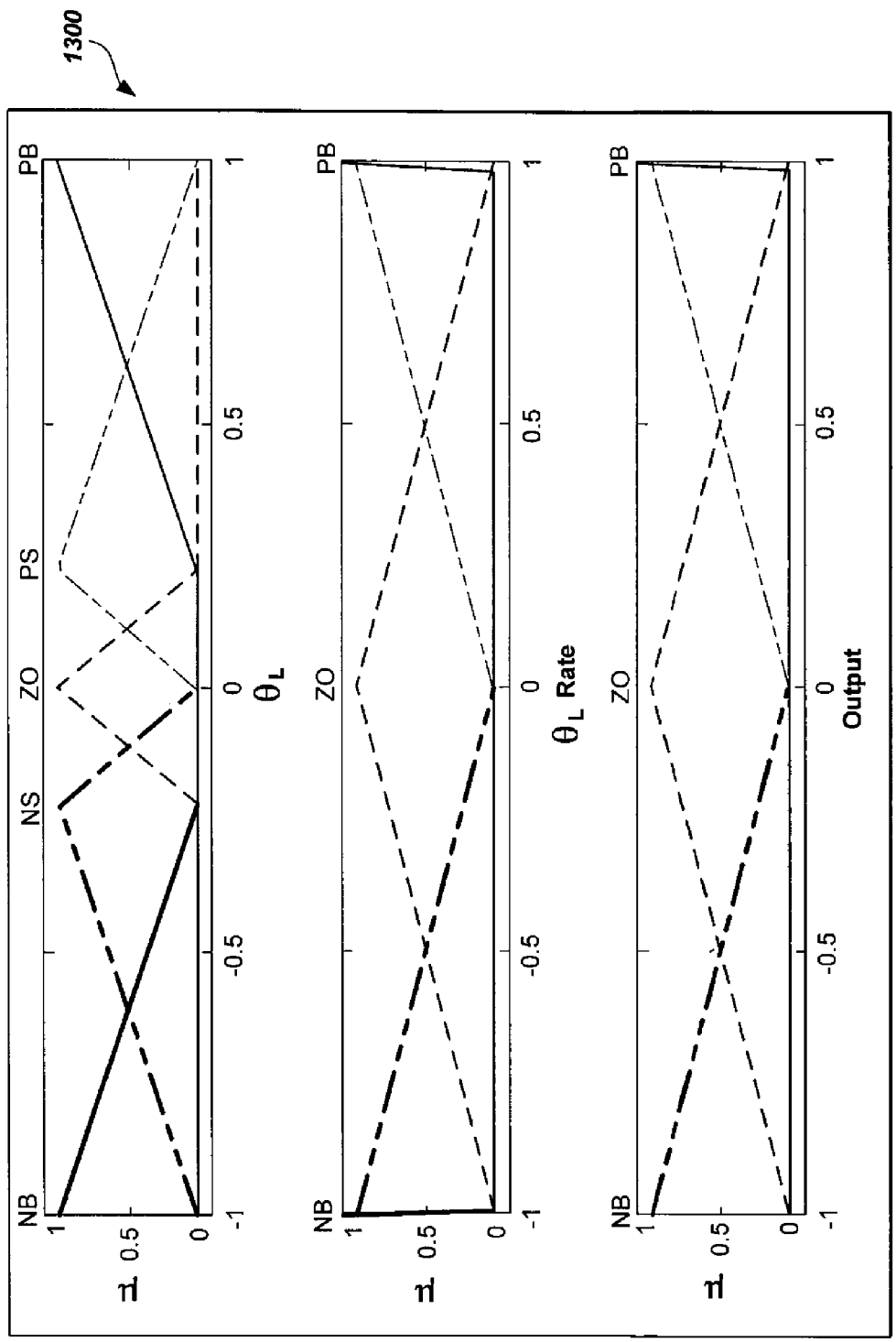
FIG. 13 is a plot showing optimized distribution for out of plane swinging movement using a proportional-derivative fuzzy controller (PDFC).

For the optimization of PDFC, the code is executed five times. In these multiple runs, the number of particles is chosen to be 10. The evolution of PSO is shown in plot 1100 of FIG. 11. Although, every run starts with different optimum values, all the runs converge nearly to the same value. This indicates the robustness of the PS0. It should be noted that $\gamma_1 \gamma_2=1$ is used for the first two runs and they are increased to 2 for the subsequent three runs. Increasing these constants increases the speed of convergence of the PS0 code. The optimum values of the design parameters are nearly similar for the five runs. The average values are used as the optimum values for PDFC. The Membership Function distributions that correspond to this controller are shown in plots 1200 of FIG. 12 and plots 1300 of FIG. 13 for the in-plane and out-of-plane motions respectively.

Figure 14:
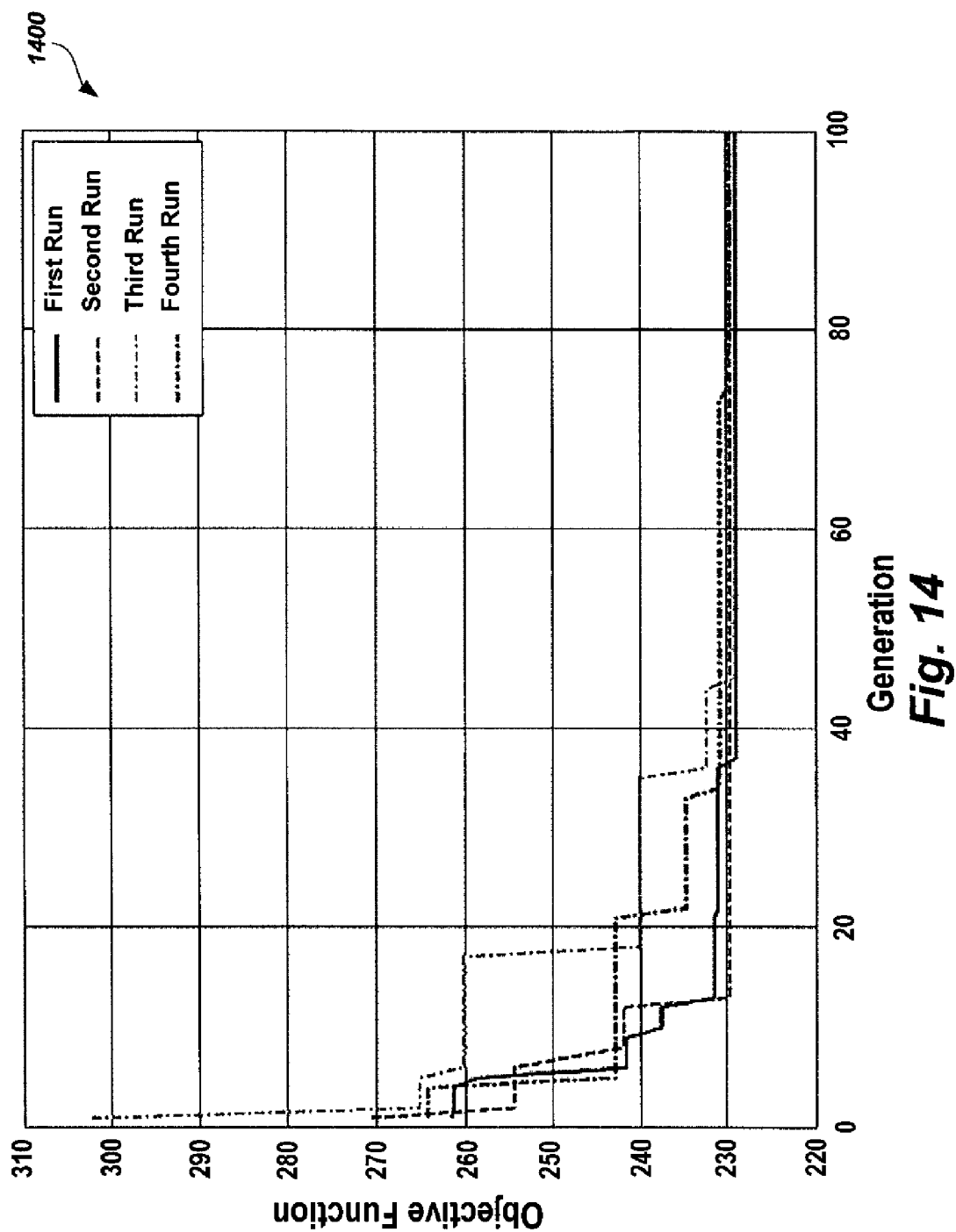
FIG. 14 is a plot showing evolution of PSO for optimizing fuzzy anti-swing controller (FASC) membership functions.
Figure 15:
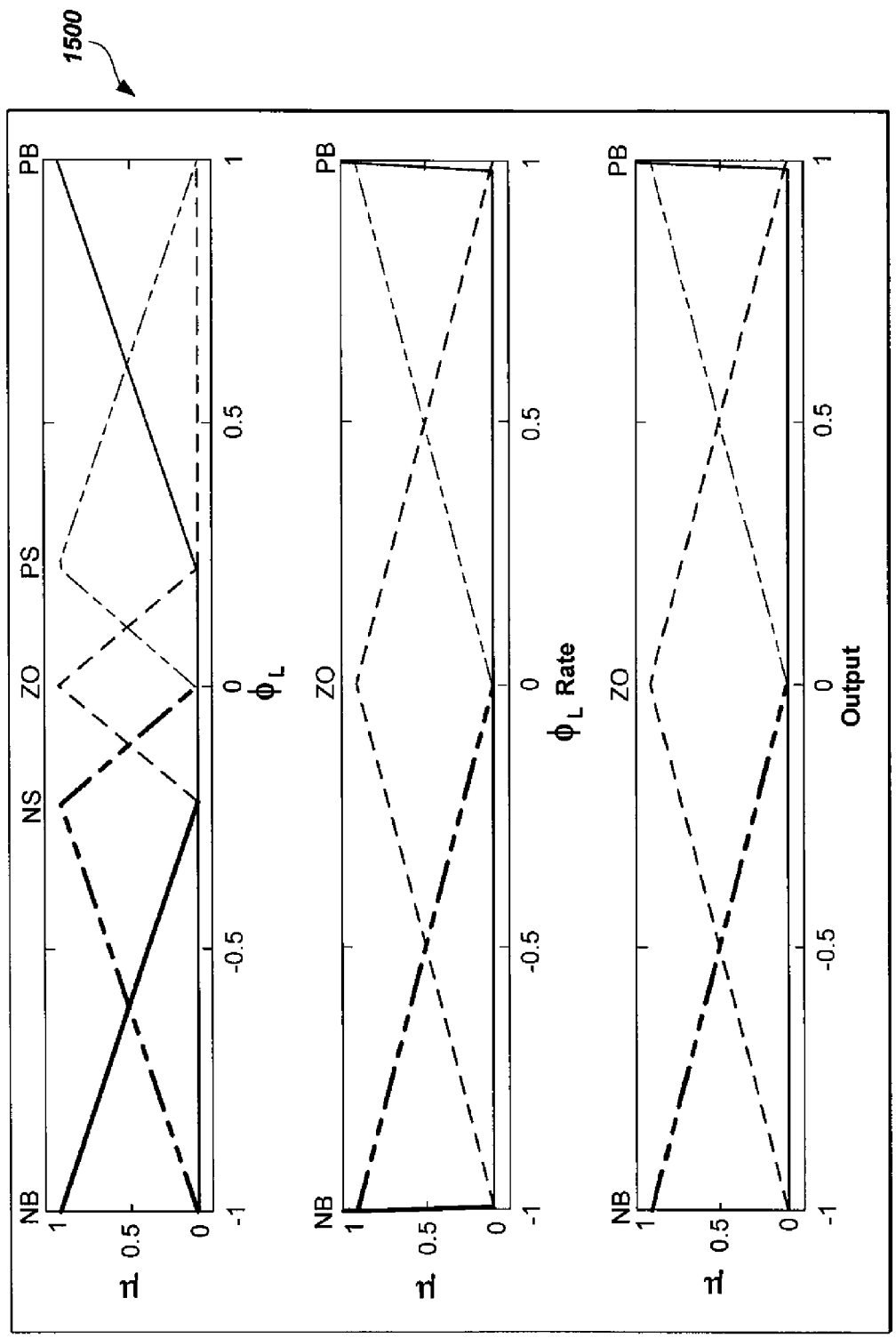
FIG. 15 is a plot showing optimized membership function distribution for an in-plane controller, (FASC).
Figure 16:
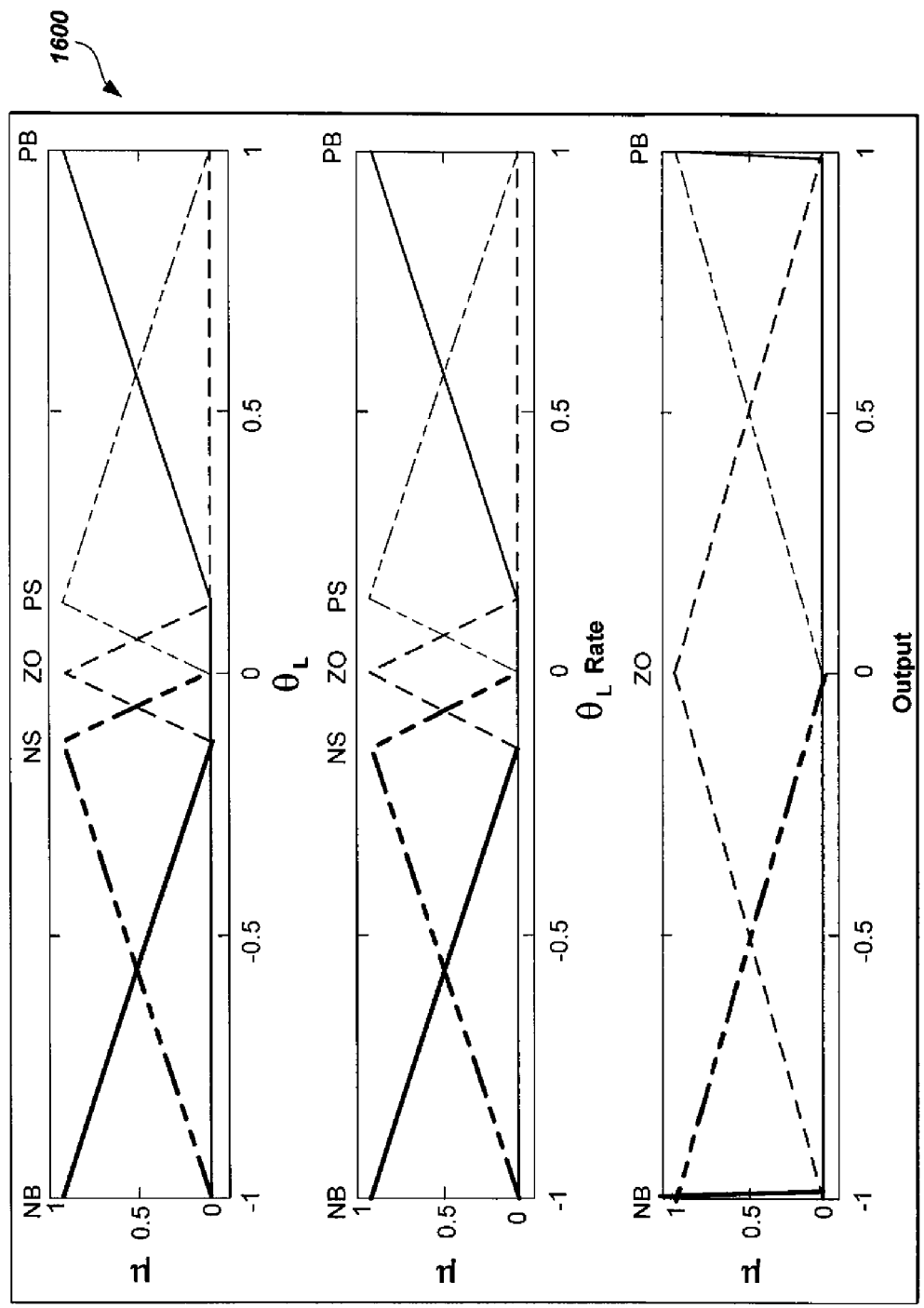
FIG. 16 is a plot showing optimized membership function distribution for out-of-plane controller, (FASC).

The same procedure used in optimizing PDFC is also implemented to optimize the proposed anti-swing fuzzy controller (FASC). The same parameters of PSO codes are used with $\gamma_1=\gamma_2=2$. The number of particles is also 10 for all the runs except the first run where 20 particles are used to check the effect of increasing the size of population on the performance of PSO. Increases in the number of particles cause increases in the number of simulations, which consumes a lot of computational time. The evolutions of the four runs are shown in plot 1400 of FIG. 14. The first run converges faster than the third and the fourth runs but with the same rate as the second run although the number of particles in the fourth run is 10, as in the third and the fourth runs. All the runs converge nearly to the same value of ISH although their initial optimum values are different. Therefore, it is concluded that 10 particles is an adequate number for the instant control problem. The MF distributions 1500 and 1600 that correspond to this controller are shown in FIGS. 15 and 16 for the in-plane and out-of-plane motions respectively.

Comparing the optimum objective function that results from the two fuzzy controllers, it is observed that the FASC has the lowest value. Therefore, it is concluded that the anti-swing fuzzy controller has better performance than a classical PD-fuzzy controller. Moreover, it was shown that FASC has better performance compared to the performance of PDFC.

The FASC rules are generated based on the time-delayed feedback anti-swing controller (DASC). So, what are the advantages of using FASC compared with DASC?. Tabular diagram 1900 of FIG. 19 lists the values of IHS for the two controllers. These values indicate that FASC even without optimization has good performance compared with DASC. But, the optimized FASC shows better performance than DASC.

Tabular diagram 2000 of FIG. 20 shows the values of the performance index (ISH) that was obtained from simulating the system with varying the slung load weight. As observed before, the optimized FASC has the best performance over the other anti-swing controllers. All the values of ISH are bounded although the parameters of the designed controller are calculated form $m_r=0.5$. These results give an indication of the robustness of the designed controllers.

The rules for the fuzzy-based anti-swing controller are derived to mimic the behavior of a time-delayed anti-swing controller. With using a simple distribution of the membership functions (MFS), FASC gives good performance in terms of the damping in the load swing and the deviation of the helicopter from its nominal position. Moreover, this performance was improved by optimally tuning MFS using PSO.

The performance of the proposed FASC is compared with the classical PD-Fuzzy controller (PDFC). From this comparison, it is found that FASC has better performance than PDFC. With another comparison with DASC, it was found that FASC even without optimization has good performance compared with DASC. But, the optimized FASC show better performance than DASC.

The PSO algorithm was used to optimally tune the parameters of the anti-swing controller. This algorithm was quite simple and easy for implementation. Multiple runs were conducted to get the optimal parameters and all of these runs converge to the same value. This gives an indication of the robustness of this algorithm.

The anti-swing controllers and the procedure for designing them for the helicopter near hover can be generalized and applied to the other types of cranes, e.g., gantry and tower cranes. Moreover, it is contemplated that the controller may work with the helicopter carrying a slung load during forward motion where the aerodynamic forces should be included in the modeling of the load swing. But due to the complexity of this system, more investigations are required. Also, experimental validation of these controllers is required. This will be the subject of future research.

It will be understood that the diagrams in the Figures depicting the control optimization technique are exemplary only, and may be embodied in a dedicated electronic device having a microprocessor, microcontroller, digital signal processor, application specific integrated circuit, field programmable gate array, any combination of the aforementioned devices, or other device that combines the functionality of the control optimization technique onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the apparatus and steps of the method described herein.

It is to be understood that the present invention is not limited to the embodiment described above, but encompasses any and all embodiments within the scope of the following claims.

I claim:

1. A fuzzy logic-based control method for a helicopter carrying a suspended load, comprising the steps of:
providing a helicopter attitude and position tracking controller, the controller being designed to generate outputs for stabilizing the helicopter while accepting tracking commands from a reference source and displacement commands from a feedback source as inputs, the design including feedback gain (k) based on minimizing a load swing history, wherein the load swing history is represented by a Linear Quadratic Regulator method, the Linear Quadratic Regulator method depending on minimizing the quadratic function, $$Indx = \int_0^{t_f} (e^T Q e + \eta^T R \eta) dt$$

wherein Indx represents the feedback gain matrix integral over time tf, wherein $\eta^T$ and $\eta$ represent helicopter control inputs, wherein $e^T$ represents an error signal, wherein Qe represents an angular velocity of a helicopter, and wherein R is a position vector of the load with respect to a center of mass of the helicopter;
determining helicopter dynamics, suspended load forces and suspended load dynamics, the suspended load dynamics including load swing angles;
providing a fuzzy logic-based anti-swing controller, the fuzzy logic-based anti-swing controller issuing the displacement commands to the helicopter attitude and position tracking controller, the displacement commands being based on fuzzy logic rules operable on a plurality of normalized fuzzy membership functions governing all fuzzy inputs and outputs and derived from time-delayed feedback of the load swing angles represented by the equation:

$$xs = k_{dx} L \Phi_L(t-\tau_{dx})$$

$$ys = k_{dy} L \theta_L(t-\tau_{dy})$$

where xs and ys are additional displacement outputs added to the helicopter trajectory in a longitudinal and lateral direction, wherein $\phi_L$ is the load angle in a xz plane and $\theta_L$ is the load angle out of a xz plane, respectively, k is a feedback gain, L is a load cable length and τ is a time delay introduced in a feedback model of the load swing angles, the fuzzy inputs including $\theta_L$ and $\theta_L$ rate, the fuzzy outputs including a longitudinal displacement;
optimally selecting values for the k, and τ parameters by minimizing an index function expressed in terms of a time history of the load swing, the index function minimizing being performed using an evolutionary computation algorithm; and
implementing an optimized fuzzy logic-based anti-swing controller in a feedback control loop with the tracking controller to achieve suspended load swing reduction of the suspended load and stability control of the helicopter.

2. The fuzzy logic-based control method according to claim 1, wherein said evolutionary computation algorithm is a particle swarm optimization algorithm.

3. The fuzzy logic-based control method according to claim 1, further comprising configuring five of the membership functions corresponding to the $\theta_L$ input, the five membership functions including Negative Big (NB), Negative Small (NS), Zero (ZO), Positive Small (PS) and Positive Big (PB), wherein at least two of the membership functions overlap.

4. The fuzzy logic-based control method according to claim 3, further comprising the steps of:
   overlapping the NS membership function with the NB membership function;
   overlapping the Z0 membership function with the NS membership function;
   overlapping the PS membership function with the ZO membership function; and
   overlapping the PB membership function with the PS membership function.

5. The fuzzy logic-based control method according to claim 1, further comprising the step of configuring three of said membership functions corresponding to said $\theta_L$ rateinput, said three membership functions including Negative Big (NB), Zero (ZO), and Positive Big (PB), wherein at least two of said membership functions overlap.

6. The fuzzy logic-based control method according to claim 5, further comprising the steps of:
   overlapping the ZO membership function with the NB membership function; and
   overlapping the PB membership function with the ZO membership function.

7. The fuzzy logic-based control method according to claim 1, further comprising the step of configuring three of the membership functions corresponding to one of the displacementoutputs, the three membership functions including Negative Big (NB), Zero (ZO), and Positive Big (PB), wherein at least two of the membership functions overlap.

8. The fuzzy logic-based control method according to claim 7, further comprising the steps of:
   overlapping the ZO membership function with the NB membership function; and
   overlapping the PB membership function with the ZO membership function.

9. The fuzzy logic-based control method according to claim 1, further comprising the steps of:
   assigning ranges to the normalized membership functions; and
   using scaling factors to transform the ranges of the normalized membership functions to physical operating ranges based on a maximum value of the load swings and a maximum value of the helicopter displacements.

10. A computer software product, comprising a non-transitory storage medium readable by a processor, the medium having stored thereon a set of instructions for issuing displacement control commands to a helicopter carrying a suspended load while in hover flight, the set of instructions including:
    (a) a first sequence of instructions which, when executed by the processor, causes said processor to configure a helicopter attitude and position tracking controller, the helicopter attitude and position tracking controller being designed to generate outputs for stabilizing the helicopter while accepting tracking commands from a reference source and displacement commands from a feedback source as inputs, the design configuration including feedback gain k based on minimizing a load swing history, wherein the load swing history is represented by a Linear Quadratic Regulator method, the Linear Quadratic Regulator method depending on minimizing the quadratic function:

$$Indx = \int_0^{t_f} (e^T Q e + \eta^T R \eta) dt$$

wherein Indx represents the feedback gain matrix integral over time tf, wherein $\eta^T$ and $\eta$ represent helicopter control inputs, wherein $e^T$ represents an error signal, wherein Qe represents an angular velocity of a helicopter, and wherein R is a position vector of the load with respect to a center of mass of the helicopter;
    (b) a second sequence of instructions which, when executed by the processor, causes said processor to determine helicopter dynamics, suspended load forces and suspended load dynamics, the suspended load dynamics including load swing angles;
    (c) a third sequence of instructions which, when executed by the processor, causes said processor to configure an anti-swing controller, the anti-swing controller issuing the displacement commands to the helicopter attitude and position tracking controller the displacement commands being based on time-delayed feedback of the load swing angles represented by the equation:

$$xs = k_{dx} L \Phi_L(t - \tau_{dx})$$

$$ys = k_{dy} L \theta_L(t - \tau_{dy})$$

where Xs, and ys are additional displacement added to the helicopter trajectory in a longitudinal and lateral direction, wherein $\phi_L$ is the load angle in a xz plane and $\theta_L$ is the load angle out of a xz plane, respectively, k is a feedback gain, L is a load cable length and $\tau$ is a time delay introduced in the feedback of the load swing angles, the fuzzy inputs including $\theta_L$ and $\theta_L$ rate, the fuzzy outputs including a longitudinal displacement;
    (d) a fourth sequence of instructions which, when executed by the processor, causes said processor to optimally select values for the k, and $\tau$ parameters by minimizing an index function expressed in terms of a time history of the load swing, the index function minimizing being performed using an evolutionary computation algorithm, the index function minimizing being performed using an evolutionary computation algorithm; and
    (e) a fifth sequence of instructions which, when executed by the processor, causes said processor to implement an optimized anti-swing controller in a feedback control loop with the tracking controller to achieve suspended load swing reduction and stability control of the helicopter.

11. The computer software product according to claim 10 wherein said evolutionary computation algorithm is a particle swarm optimization algorithm.

12. The computer software product according to claim 10, wherein the set of instructions further comprises:
    (f) a sixth sequence of instructions which, when executed by the processor, causes said processor to configure five of the membership functions corresponding to the $\theta_L$ input, the five membership functions including Negative Big (NB), Negative Small (NS), Zero (ZO), Positive Small (PS) and Positive Big (PB), wherein at least two of the membership functions overlap.

13. The computer software product according to claim 12, wherein the set of instructions further comprises:
    (g) a seventh sequence of instructions which, when executed by the processor, causes said processor to:
        overlap the NS membership function with the NB membership function;

overlap the Z0 membership function with the NS membership function;

overlap the PS membership function with the ZO membership function; and overlap the PB membership function with the PS membership function.

14. The computer software product according to claim 10, wherein the set of instructions further comprises:
(h) an eighth sequence of instructions which, when executed by the processor, causes said processor to configure three of the membership functions corresponding to the $\theta_L$ rateinput, the three membership functions including Negative Big (NB), Zero (ZO), and Positive Big (PB), wherein at least two of the membership functions overlap.

15. The computer software product according to claim 14, wherein the set of instructions further comprises:
(i) a ninth sequence of instructions which, when executed by the processor, causes said processor to:
overlap the ZO membership function with the NB membership function; and
overlap the PB membership function with said ZO membership function.

16. The computer software product according to claim 10, wherein the set of instructions further comprises:
(j) a tenth sequence of instructions which, when executed by the processor, causes said processor to configure three of the membership functions corresponding to one of the displacement outputs, the three membership functions including Negative Big (NB), Zero (ZO), and Positive Big (PB), wherein at least two of the membership functions overlap.

17. The computer software product according to claim 16, wherein the set of instructions further comprises:
(k) an eleventh sequence of instructions which, when executed by the processor, causes said processor to:
overlap the ZO membership function with the NB membership function; and
overlap the PB membership function with the ZO membership function.

18. The computer software product according to claim 10, wherein the set of instructions further comprises:
(l) a twelfth sequence of instructions which, when executed by the processor, causes said processor to assign ranges to the normalized membership functions; and use scaling factors to transform the ranges of the normalized membership functions to physical operating ranges based on a maximum value of the load swings and a maximum value of the helicopter displacements.

* * * * *